United States Patent
Sun et al.

(10) Patent No.: US 7,608,649 B2
(45) Date of Patent: Oct. 27, 2009

(54) BIODEGRADABLE MATERIALS FROM STARCH-GRAFTED POLYMERS

(75) Inventors: Zhenhua Sun, Conway, AR (US); Wanjun Liu, Okemos, MI (US); Ya-Jane Wang, Fayetteville, AR (US)

(73) Assignee: Cereplast, Inc., Los Angeles, CA (US)

( * ) Notice: Subject to any disclaimer, the term of this patent is extended or adjusted under 35 U.S.C. 154(b) by 459 days.

(21) Appl. No.: 10/506,418

(22) PCT Filed: Feb. 26, 2003

(86) PCT No.: PCT/US03/05661

§ 371 (c)(1), (2), (4) Date: Mar. 30, 2005

(87) PCT Pub. No.: WO03/074604

PCT Pub. Date: Sep. 12, 2003

(65) Prior Publication Data

US 2005/0171249 A1    Aug. 4, 2005

Related U.S. Application Data

(60) Provisional application No. 60/360,324, filed on Feb. 28, 2002.

(51) Int. Cl.
*C08L 3/00* (2006.01)
*C08L 89/00* (2006.01)
*D21H 19/54* (2006.01)

(52) U.S. Cl. ........................................................ 524/47
(58) Field of Classification Search ................. 524/47, 524/52, 53, 81; 525/285
See application file for complete search history.

(56) References Cited

U.S. PATENT DOCUMENTS

| | | | |
|---|---|---|---|
| 5,115,000 A | | 5/1992 | Jane et al. |
| 5,216,075 A | * | 6/1993 | Papazoglou ................ 525/66 |
| 5,415,827 A | | 5/1995 | Tomka et al. |
| 5,461,094 A | | 10/1995 | Yoo et al. |
| 5,496,895 A | * | 3/1996 | Chinnaswamy et al. .... 525/54.2 |
| 5,500,465 A | * | 3/1996 | Krishnan et al. .............. 524/47 |
| 5,510,401 A | * | 4/1996 | Dehennau et al. ............. 524/47 |
| 5,627,223 A | | 5/1997 | Dehennau et al. |
| 5,667,574 A | | 9/1997 | Zhang |
| 6,231,970 B1 | * | 5/2001 | Andersen et al. ............ 428/332 |
| 6,242,503 B1 | * | 6/2001 | Kozma et al. ................ 525/193 |

OTHER PUBLICATIONS

Yoo et al. (Journal of Applied Polymer Science, vol. 83, 767-776, 2002) (Available online Nov. 20, 2001).*
"Effects Of Glycerol and PE-g-MA on Morphology, Thermal and Tensile Properties of LDPE and Rice Starch Blends", Y.J. Wang, W. Liu, Z.Sun, Journal of Applied Polymer Science, vol. 92, 344-350, Aug. 12, 2003.
"Effects of Glycerol and PE-g-MA on Morphology, Thermal and Tensile Properties of LDPE and Rice Starch Blends", Y.J. Wang, W. Liu, Z. Sun, Journal of Applied Polymer Science, vol. 92, 344-350, Aug. 12, 2003.

(Continued)

*Primary Examiner*—Mark Eashoo
*Assistant Examiner*—Liam J Heincer
(74) *Attorney, Agent, or Firm*—K&L Gates LLP (57) ABSTRACT

Granular starch is added to a polymer in order to decrease the cost of the polymer derivative. Use of granular starch also makes the derivative more biodegradable. The polymer blend has very similar mechanical properties to pure polymer. Furthermore, unlike other starch/polyethylene mixtures, glycerol is not added to the mixture. This reduces the water absorbency of the final product. The polymer and starch are blended together in the presence of an interfacial compatibilizer that binds the two components together.

18 Claims, 4 Drawing Sheets

OTHER PUBLICATIONS

"Technology of Corn Wet Milling and Associated Processes," Blanchard, Paul Harwood, Industrial Chemistry Library, vol. 4, 127-154, 1992.

Bhattacharya et al., "Properties of Blends of Starch and Synthetic Polymers Containing Anhydride Groups. II. Effect of Amylopectin to Amylose Ratio in Starch," Journal of Applied Polymer Science, vol. 57 (1995), pp. 539-554.

Bikiaris et al., LDPE/Starch Blends Compatibilized with PE-g-MA Copolymers, Journal of Applied Polymer Science, vol. 70 (1998) pp. 1503-1521.

Bikiaris et al., "LDPE/plasticized starch blends containing PE-g-MA copolymer as compatibilizer," Polymer Degradation and Stability, vol. 59 (1998) pp. 287-291.

Choi et al., "Synthesis and Characterization of Starch-g-Polycaprolactone Copolymer," Macromolecules, vol. 32 (1999) pp. 7402-7408.

Dennenberg et al., "A New Biodegradable Plastic Made from Starch Graft Poly (methyl Acrylate) Copolymer," Journal of Applied Polymer Science, vol. 22 (1978) pp. 459-465.

Fanta et al., "Starch-Poly (ethylene-co-Acrylic Acid) Composite Films. Effect of Processing Conditions on Morphology and Properties," Journal of Applied Polymer Science, vol. 44 (1992) pp. 2037-2042.

Fanta et al., "Composites of Starch and Poly (ethylene-co-acrylic acid). Complexing between Polymeric Components," Journal of Applied Polymer Science, vol. 40 (1990) pp. 811-821.

Anantha, et al., "60 Co Radiation Effect on Copolymers of Starch and Plastics1," American Association of Cereal Chemists, Inc., vol. 73, No. 5 (1996), pp. 539-542.

Okaya et al., "Specific Interaction of Starch and Polyvinyl Alcohols Having Long Alkyl Groups," Journal of Applied Polymer Science, vol. 45 (1992), pp. 1127-1134.

Otey et al, "Biodegradable Films from Starch and Ethylene-Acrylic Acid Copolymer," Industrial & Engineering Chemistry Product Research and Development, vol. 16, No. 4 (1977), pp. 305-308.

Patil et al., "Graft Copolymerization of Starch with Methyl Acrylate: An Examination of Reaction Variables," Journal of Applied Polymer Science, vol. 47 (1993), pp. 1765-1772.

Prinos et al., "Preparation and Characterization of LDPE/Starch Blends Containing Ethylene/Vinyl Acetate Copolymer as Compatibilizer," Polymer Engineering and Science, vol. 38, No. 6 (May/Jun. 1998), pp. 954-964.

Psomiadou et al., Biodegradable films made from low density polyethylene (LDPE), wheat starch and soluble starch for food packaging applications. Part 2, Carbohydrate Polymers, vol. 33 (1997), pp. 227-242.

Sailaja et al., "Use of Maleic Anhydride-Grafted Polyethylene as Compatibilzer for HDPE-Tapioca Starch Blends: Effects on Mechanical Properties," Journal of Applied Polymer Science, vol. 80 (2001), pp. 863-872.

Seidenstucker et al., "Compounding Procedure, Processing Behaviour and Property Profiles of Polymeric Blends Based on Thermoplastic Poly(ester-urethanes) and Destructurized Starch," Starch/Starke, vol. 51 (1999) Nr. 2-3 S., pp. 93-102.

Shogren et al., "Polymer Compatibility and Biodegradation of Starch-Poly (ethylene-co-acrylic acid)-Polyethylene Blends," Journal of Applied Polymer Science, vol. 44 (1992), pp. 1971-1978.

J.L. Willett, Mechanical Properties of LDPE/Granular Starch Composites, vol. 54 (1994), pp. 1685-1695.

J.L. Willett, "The Role of Particle-Matrix Adhesion In Starch-Filled Composite Materials," American Chemical Society, Division of Polymer Chemistry, Journal Title: Polymer preprints, Issue 39 (1999), pp. 112-113 and cover page.

Nast et al., "Aluminium-induced crystallisation of silicon on glass for thin-film solar cells," Solar Energy Materials & Solar Cells, vol. 65 (2001), pp. 385-392.

Qi Fang, Information to Users: "Preparation and Characterization of Starch-Based Loose-Fill Packaging Foams," A Dissertation Presented to the Faculty of The Graduate College in the University of Nebraska (May 1999), 238 pgs.

* cited by examiner

BIODEGRADABLE MATERIALS FROM STARCH-GRAFTED POLYMERS

CROSS-REFERENCE TO RELATED APPLICATIONS

This application is based on Provisional Patent Application 60/360,324 filed Feb. 28, 2002 entitled "Biodegradable Materials From Starch-Grafted Polymers".

BACKGROUND OF THE INVENTION

Polymer plastics are ubiquitous in our society. They are used for everything from computer cases to paint. They have replaced many more valuable, non-renewable resources such as wood and metal. Unfortunately, plastics are not very biodegradable. This disadvantage is compounded by the fact that many plastic materials are designed to be used once and then disposed of. In addition, the trash bags into which other plastics are disposed in are made of plastic as well. The large amount of plastics being thrown away has become a serious pollution problem.

Polyethylene (PE), polypropylene (PP), polystyrene (PS), polybutylene (PB), poly(styrene-ethylene-butylene-stryrene) (SEBS), polyvinylfluoride (PVF), polyvinylchloride (PVC), poly(ethylene terephthalate) (PET) are some of the more common plastics. They are non-biodegradable and generally synthesized from petroleum products. Our society has come to depend on these materials, despite their environmental disadvantages. In addition, because they are derived from petroleum, they increase our country's dependence on imported oil. It is, therefore, desirable to find an environmentally friendly alternative to these products.

Several alternative materials have been investigated to replace these plastic polymers. Starch is a very common, environmentally friendly, biopolymer. However, pure starch is brittle and rapidly degrades when exposed to water. To overcome these deficiencies, there have been many attempts to combine starch with synthetic polymers. If starch could be used as an additive with polymers such as those listed above, it would not only increase their biodegradability, but would also make them less expensive to synthesize. For example, low density polyethylene (LDPE) costs about 50¢ per pound as opposed to starch which costs about 15¢ per pound.

Mixtures of starch and polymers have, unfortunately, resulted in materials leaving poor physical qualities. Starch generally does not mix well with the polymers listed above. In an attempt to improve these mixtures, some researchers have used high amylose starch. Although high amylose starch slightly improves the physical properties of the mixtures, it is relatively expensive and reduces or eliminates the cost benefits of these mixtures. Gelatinized starch has also been used in an attempt to improve these mixtures. However, gelatinized starch as well as high amylose starch requires the addition of a plasticizer. Gelatinized starch results from processing raw starch. This increases its cost and, therefore, makes it less economical than raw starch.

The addition of a plasticizer poses another disadvantage. As with requiring processing of the starch, this increases the cost. In addition, plasticizers such as glycerol increase the water absorbency of the polymer and starch mixture. This has a deleterious effect on the mixture's physical properties, making them impractical.

Raw, granular starch comes from a variety of sources, including corn, wheat, rice and potatoes. Wheat and rice granular starch tends to be the least expensive.

U.S. Pat. No. 6,218,532 discusses a method of synthesizing materials from amylose starch derivatives. The starch is chemically modified to form starch ethers, esters, and carbamates. It does not disclose cross-linking of starch to polyethylene.

U.S. Pat. No. 6,235,815 discloses mixing of starch with a hydrophobic biodegradable polymer, including polyethylene oxide. It does not include a compatibilizer to covalently attach polyethylene to granular starch.

U.S. Pat. No. 5,719,214 discloses starch polymer having polyester grafted onto it. It does not disclose polyethylene having granular starch grafted onto it.

U.S. Pat. No. 5,569,692 describes a starch-based composition for the production of articles of biodegradable plastics material. The starch is heated with a destructuring agent in order to destructure the starch. It is then mixed with a polymer, preferably polyvinyl alcohol or ethylene vinyl alcohol. This patent does not disclose covalent grafting of granular starch onto polyethylene.

U.S. Pat. No. 5,461,094 discloses the formation of a biodegradable material by chemically bonding starch with polyethylene. However, the method disclosed in this patent is significantly more complex than the present invention. It requires the use of a radical initiator and acid catalytic co-monomer and auto oxidizing agent and a plasticizer. It does not disclose the simple covalent attachment of granular starch to polyethylene.

It is therefore desirable to develop an inexpensive method for synthesizing a starch/polymer mixture in which inexpensive, unprocessed starch of any variety may be used.

BRIEF SUMMARY OF THE INVENTION

The present invention discloses a new starch and polymer mixture and method for making it. Those skilled in the art will appreciate that starch/polymer blends in the past have used expensive varieties of starch and the blends have had inferior physical qualities. These varieties include high amylose starch and processed starch such as gelatinized starch and starch ethers and esters. The present invention requires only granular starch and provides blend that has physical characteristics very similar to those of the pure polymer. Furthermore, any type of starch may be used, including wheat and rice starch. The ability to use these inexpensive types of starch greatly enhances the cost efficiency of the present invention.

The present invention involves mixing starch with a primary polymer and a compatibilizer that has grafting compounds attached to it. These grafting compounds covalently bond to the hydroxyl groups located on granular starch. Starch hydroxyl groups are susceptible to binding by these grafting compounds. Because the starch is chemically grafted to the compatibilizer, which in turn physically interacts with the polymer, the resulting mixture has substantially the same physical properties as the polymer in its pure form. Up to 30% of the mixture may be granular starch. Because the starch may be granular wheat or rice starch, this greatly reduces the cost of manufacturing the polymer. In addition, it greatly enhances the biodegradability of the mixture. Polymers having grafting compounds already attached to them are presently commercially available and are only slightly more expensive than the unaltered polymers. This difference in cost is more than compensated for by the use of inexpensive starch.

Another significant advantage of the present invention is its simplicity. The compatibilizer, commercially available polymers having a grafting compound attached to them, are mixed with granular starch and the polymer under heat and pressure. The heat and pressure causes the grafting compound of the compatibilizer to covalently bind to hydroxyl groups on the granular starch. The resulting blend has mechanical properties very similar to that of pure polymer. Furthermore, the disclosed blend is significantly less expensive than a pure polymer as well as significantly more biodegradable.

Another advantage of the present invention is the lack of a plasticizer. In existing starch/polymer blends, a plasticizer is utilized to facilitate blending of the starch and polymer. This has the deleterious effect of increasing water absorbency of the blend. Eliminating the need for a plasticizer, by replacing it with a compatibilizer, the water absorbency of the final product is reduced. This allows for a stronger, more durable product. This also reduces the cost of manufacture.

Generally, the compatibilizer is essentially the same polymer that is being mixed with the starch. Typically, the concentration of the compatibilizer is about 10% that of the starch. That is, if the starch concentration is 20% by weight, then the compatibilizer will comprise about 2% by weight of the total mixture and the polymer itself will comprise approximately 78% of the mixture. However, the amount of compatibilizer may be as much as 80% by weight of the starch. It may also be as little as 5% by weight of the mixture. Typically, the compatibilizer is comprised of the same polymer as the primary polymer itself. The only difference is that the compatibilizer has a grafting compound attached to it. Typically, the compatibilizer is only about 5% by weight grafting compound, and 95% by weight polymer. It is not necessary that the compatibilizer be comprised of the same polymer as the primary polymer. Any polymer that blends well with the primary polymer may be used.

Preferably, only about 5 wt % of the monomer units of the compatibilizer has a grafting compound attached. Another preference, but not necessary, is that the granular starch be between 20 and 25 micrometers in diameter. It is also preferable to have between 1 and 30 wt % starch. If the blend is comprised of greater than 30 wt % starch, poor mechanical properties result.

Another advantage of the present invention is its simplicity. No additional steps need to be added to the formation of the product. Normally, polymers are cured under heat and pressure. Granular, unprocessed starch and compatibilizer may simply be added to this curing process. Without any additional steps, the curing process, due to its inherent properties of heat and pressure, induce covalent bonding of granular starch to the grafting compound. The simple addition of unprocessed starch to an existing process further increases the cost efficiency of the present invention. Those skilled in the art will appreciate the significant advantages of the invention. The invention can be applied to any products that currently use PE, PP, PS, PB, SEBS, PET, PVF and/or PVC.

In the embodiments described below, maleic anhydride is preferred as the grafting compound for the compatibilizer, which facilitates covalent bonding of granular starch to the compatibilizer. This is generally because of its ready availability. Those skilled in the art will appreciate that similar grafting molecules may also be suitable. Those skilled in the art will also appreciate that derivatives of the polymers listed above may also be suitable compatibilizers and primary polymers in the present invention.

DETAILED DESCRIPTION OF THE INVENTION

The present invention comprises the use of a primary polymer being cured by heat and pressure in the presence of granular starch and a compatibilizer. The curing process covalently binds the grafting compound of the compatibilizer to the starch. This results in a material having substantially the same mechanical properties as the pure polymer but being less expensive and more biodegradable. Compatibilizers, polymers having grafting compounds attached to them, are commercially available. An example of a grafting compound is maleic anhydride. An example of a good compatibilizer is polyethylene including approximately 5% by weight maleic anhydride which is commercially available and only slightly more expensive than pure polyethylene. Those skilled in the art will appreciate that maleic anhydride is only one of many suitable grafting compounds. Any grafting compound capable of covalently bonding to an hydroxyl group while under heat and pressure will be suitable. Whether or not the primary polymer or compatibilizer is linear is not important. Similarly, the average length of the polymer does not significantly affect the invention. No plasticizer is required. It is also not necessary to process the raw, granular starch in any way. In this particular embodiment, PE is the polymer used for both primary polymer and compatibilizer. However, PE, PP, PS, PET, SEBS, PVF, PB, PVC, and other similar polymers may be used with equally effective results.

Figure 1:
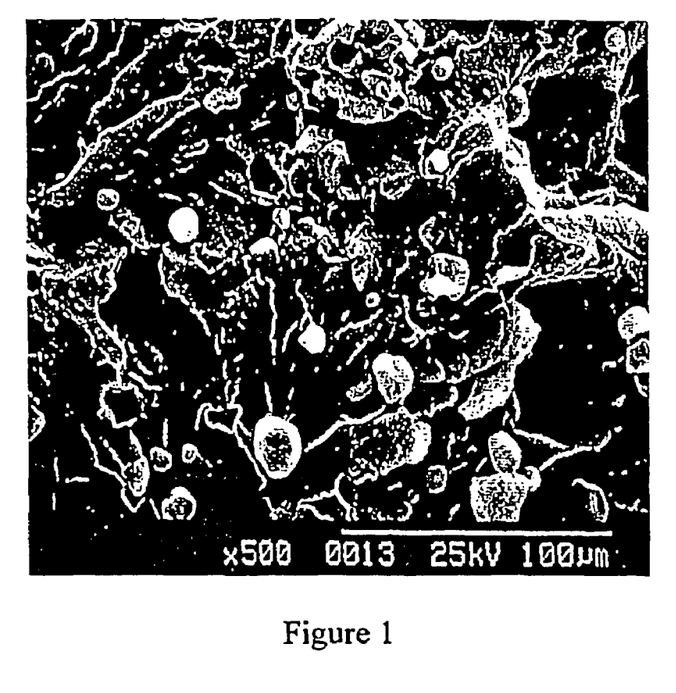
FIG. 1 shows an electron micrograph of a starch and polyethylene mixture without a compatibilizer.
Figure 2:
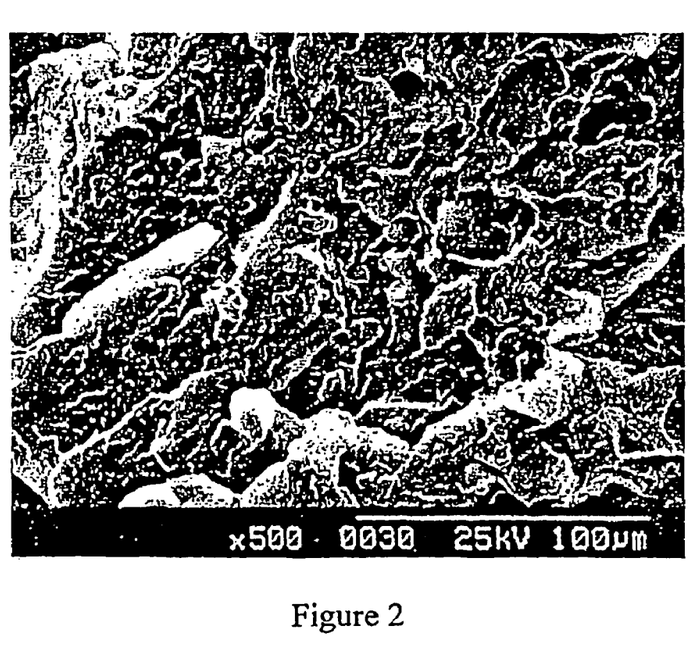
FIG. 2 shows an electron micrograph of a mixture of starch, polyethylene and a compatibilizer.

The scanning electron micrographs of liquid nitrogen fractured surface of PE/granular cornstarch samples reflect the phase morphology of the matrix and particles (FIGS. 1 and 2). Strong chemical interactions between PE and starch can be observed in the presence of compatibilizer (FIG. 2) compared to the sample with no compatibilizer (FIG. 1). The compatibilizer enables granular starch to become part of the PE matrix through covalent bonding to the compatibilizer and will not be leached out after processing. The mixture as shown in FIG. 1 consists only of granular starch and polyethylene. The mixture shown in FIG. 2 consists of granular starch, polyethylene and a compatibilizer. The compatibilizer consists of polyethylene having maleic anhydride molecules covalently attached. The maleic anhydride constitutes approximately 5% by weight of the compatibilizer. The maleic anhydride grafting agents covalently bond to hydroxyl groups on the granular starch. Because the maleic anhydrides constitute a relative low weight percent of the compatibilizer, there are significant sections of polyethylene in the compatibilizer that are hydrophobic. These hydrophobic regions allow the compatibilizer to physically interact with the pure polyethylene polymer. Thus, the granular starch in the polyethylene is much more closely and more tightly associated. In FIG. 1, it can be clearly seen that the granular starch is entirely immiscible and in no way bound to the polyethylene. In contrast, the mixture in FIG. 2 shows them much more blended together and more connected. Those skilled the art will appreciate that the chemical and physical cohesive properties of the interfacial compatibilizer greatly enhance the strength of the resulting mixture.

The compatibilizer improves the mechanical properties of PE/starch and addition of a plasticizer is actually detrimental to the finished products. See Tables 1-4. The addition of glycerol (plasticizer) not only decreases the mechanical properties of starch-filled PE but also has a negative effect on the mechanical properties of starch-filled PE after one month of storage because glycerol is not compatible with PE. While here PE is used to exemplify the results of the present invention, results are practically the same with other combinations of polymer and compatibilizer as disclosed herein.

Incorporating compatibilizer is easily accomplished by mechanically blending the polymer, starch, and compatibilizer prior to extrusion. By using granular starch, no additional processing step is needed to prepare plasticized or gelatinized starch. The starch can be from different sources, such as corn, rice, and potato, and can be either in unmodified or modified form. PE can also be of different types, such as linear low density BE (LDPE) or high density PE (HDPE). This invention will make a significant contribution to the environment by substituting starch (renewable and biodegradable) for petroleum-based PE and other polymers. It is also very important to note that the use of starch to replace PE significantly (~15%) reduces production cost. For example, corn starch costs 10-15¢ per pound vs. PE at 70-100¢ per pound.

The present invention is suitable for a wide variety of polymers, especially hydrophobic polyolefins. Examples of suitable polymers include polyethylene, polypropylene, polystyrene, polybutyldiene, polyvinylchloride, SEBS, PET, combinations thereof and other primarily hydrophobic polymers. The polymer may be either high density or low density or a combination thereof. Average polymer length is not important. Very long chain, ultra high molecular weight polymers are suitable as well as short polymers. However, polymers having a length of 100-1000 monomers are generally preferred.

In the prior art, great effort is put into modifying starch in order to enhance its miscibility with the relatively hydrophobic polymer with which it is mixed. This has proven to be very inefficient because improvements in physical properties is minimal while the modifications are relatively expensive. Because modified starches have performed poorly, the use of granular starch has been dismissed by the prior art as even more impractical. One of the significant advantages of the present invention is that it provides a method for utilizing unmodified and unprocessed granular starch. In fact, in the present invention, unprocessed, granular starch produces superior properties compared to when the invention is applied to modified, plasticized, gelatinized, de-proteinated or otherwise processed starches. One of the novel aspects of the present invention is the highly unexpected result that a less expensive and simpler process produces a product having physical properties superior to the polymer/starch mixtures of the prior art. Furthermore, starches from any of a variety of plants are suitable in the present invention. Granule size may vary greatly without significantly effecting the physical properties of the present invention. While granules approximately 25 micrometers in diameter are preferred, large variations in granule diameter have only a minimal effect in the physical properties of the end product. Those skilled in the art will appreciate that, because different starches are more plentiful in different parts of the world, the ability of the present invention to utilize a variety of starches is highly advantageous. Starches such as those derived from wheat, corn, rice and potatoes are only some of the many starches that are suitable.

One of the important features of the present invention that allows for a product having superior qualities and produced by a simple and inexpensive method is its use of a compatibilizer. The compatibilizer is a polymer laving a starch binding compound attached to it. The polymer is typically a polyolefin or other relatively hydrophobic polymer. The starch binding compound is typically a relatively small organic compound that is covalently attached to the polymer main chain and is such that it is capable of forming covalent bonds with starch granules. Optionally, the starch binding compound may also form hydrogen bonds and salt bridges with the starch granules.

Starch binding compound in the present invention is typically an anhydride. Specifically, maleic anhydride is preferred. Primarily hydrophobic polymers having maleic anhydride bound to it are readily available for purchase. Their availability makes them relatively inexpensive and easy to obtain. However, almost any molecule having an anhydride functional group is suitable for the starch binding compound of the present invention. Anhydrides having a sterically unpreferred structure are especially suitable because they tend to be more volatile than other hydride compounds. This is another reason why maleic anhydride is especially suitable in the present invention. Similarly, other compounds capable of forming ester linkages with hydroxyl groups and having sterically unfavorable geometries are suitable starch binding compounds. For example, many epoxides are suitable.

Those skilled in the art will appreciate that starch granules have a vast abundance of hydroxyl groups within them. Under the heat and pressure conditions used for extruding and curing most hydrophobic polymers an anhydride group will react with a hydroxyl group in order to form a covalent, ester linkage. When a compatibilizer is added to a mixture of starch granules and a hydrophobic polymer, its anhydride groups will react with the hydroxyl groups of the starch granules causing them to become covalently bound. The starch binding compound is preferably a relatively small percentage of the overall weight of the compatibilizer, typically around 5 wt %. Because of this, large portions of the compatibilizer have no starch binding compound and therefore, no hydrophilicity. These regions of the compatibilizer are very hydrophobic and strongly interact with the polymer of the mixture. Because of this, the compatibilizer reacts strongly with both the hydrophillic starch granules and the hydrophobic polymer. The compatibilizer acts as a glue sticking to both the starch granules and the polymer. This is why it may be referred to as an interfacial compatibilizer. The result is a very stable and very strong product having superior physical properties as well as being biodegradable. Those skilled in the art will appreciate the numerous advantageous of the present invention.

Maleic anhydride is an effective starch binding compound for use in any of a variety of compatibilizers. This is especially so because of the availability of polymers to which maleic anhydride has been grafted. Generally, the polymer of the compatibilizer is preferably the same as the polymer being mixed with the starch granules. For example, maleic anhydride graphed polyethylene (PE-g-MA) is especially suitable for use with PE, both high density and low density. Similarly, maleic anhydride grafted polypropylene (PP-g-MA) is especially suitable as a compatibilizer for polypropylene. Both PE-g-MA and PP-g-MA are suitable for use with PET. In addition, it is been found that SEBS-g-MA is a good compatibilizer for PE, PP, PS, PB, PET, PVC and PVF. For PB, SEBS-g-MA, maleic anhydride grafted polybutylene (PB-g-MA) and glycidyl methyl acrylate grafted polybutylene (PB-g-GMA) are all suitable compatibilizers. In addition, glycidyl methyl acrylate grafted poly(methyl methacrylate) (PMMA-g-GMA) is a good compatibilizer for both PVC and PVF. Those skilled in the art will appreciate that any polymer that blends well with the polymer being, mixed with starch granules will serve well as the polymer compatibilizer.

Figure 3:
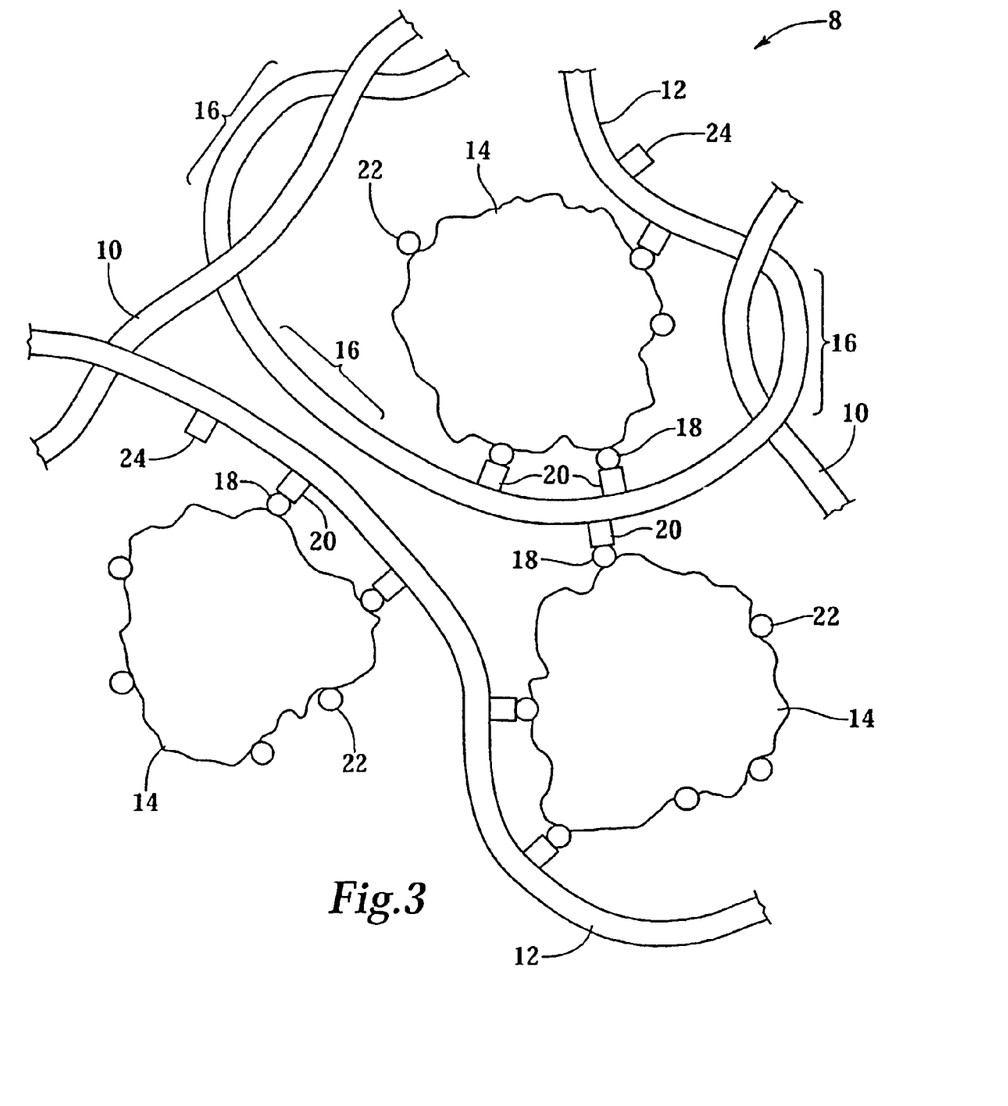
FIG. 3 is a diagrammatic representation of the intermolecular interactions of the present invention.

FIG. 3 shows a schematic diagram of the chemical and physical interactions of the molecules involved to make the present invention possible. Polymer/starch product 8 is comprised of polymer 10, compatibilizer 12 and starch granules 14. Polymers 10 and compatibilizer 12 hydrophobically interact at regions 16. Compatibilizer 12 has starch binding compounds 20 and 24. Starch granules 14 leave hydroxyl groups 18 and 22. Hydroxyl groups 18 lave reacted with starch binding compounds 20 in order to covalently bind starch granules to the compatibilizer. Hydroxyl groups 22 are unbound and remain as hydroxyl groups. Hydroxyl groups 18 have reacted with starch binding compounds 20 and are covalently bound by an ester linkage. Starch binding compounds 24 are not proximal to starch hydroxyl groups and therefore remain unbound.

FIG. 3 illustrates how the compatibilizer strongly bonds to both the hydrophilic starch granules and the hydrophobic polymers.

Typically, the grafting compound will comprise approximately 5% by weight of the compatibilizer. It is not necessary that the compatibilizer be comprised of the same polymer as the primary polymer.

EXAMPLE 1

Low Density Polyethylene (LDPE) is a product of Dow Chemical Company (Midland, Mich.), LDPE 6401, with a melt flow index of 2 g/10 min. Commercial cornstarch was obtained from Cerestar USA Inc. (Hammond, Ind.). Cornstarch was dried at 120° C. for 24 hr to a moisture content of less than 1% prior to samples preparation. Polyethylene grafted maleic anhydride (PE-g-MA) may be obtained from Aldrich Chemical Company Inc. (Milwaukee, Wis.).

Cornstarch, PE-g-MA (10% of Cornstarch weight) and LDPE were blended at room temperature with a KitchenAid mixer (St. Joseph, Mich.) at starch to LDPE ratios of 5%, 10%, 15%, 20%, 25% (w/w). Then these blends were melt-blended in a lab scale twin screw counter-rotating extruder (PolyLab, ThermoHaake, Madison, Wis.) with a processing temperature of 170° C. and a processing speed of 50 rpm.

Dumbbell-shaped specimens were prepared from extruded samples. The tensile tests were carried out with an Universal Testing Machine (Model 1011, Instron, Canton, Mass.) at 23° C. with a crosshead speed of 20 mm/min. Five specimens were tested for each samples and the average values were reported.

TABLE 1

The effects of compatibilizer (PE-g-MA, 10% based on starch weight) on the tensile properties of PE/cornstarch in the absence of plasticizer (glycerol)

| PE/Cornstarch/Plasticizer | Without Compatibilizer | | With Compatibilizer | |
|---|---|---|---|---|
| | Tensile Strength (MPa) | Elongation at Break (%) | Tensile Strength (MPa) | Elongation at Break (%) |
| 100/0/0 | 13.84 | 728 | | |
| 100/5/0 | 12.93 | 709 | 13.06 | 703 |
| 100/10/0 | 12.76 | 613 | 12.61 | 610 |
| 100/15/0 | 12.67 | 598 | 11.72 | 600 |
| 100/20/0 | 10.06 | 459 | 11.50 | 548 |
| 100/25/0 | 8.72 | 278 | 10.98 | 478 |

TABLE 2

The effect of plasticizer (glycerol, 25% based on starch weight) on the on the tensile properties of PE/cornstarch with compatibilizer

| PE/Cornstarch/Compatibilizer (PE-g-MA) | Without Plasticizer | | With Plasticizer | |
|---|---|---|---|---|
| | Tensile Strength (MPa) | Elongation at Break (%) | Tensile Strength (MPa) | Elongation at Break (%) |
| 100/5/0.5 | 13.06 | 703 | 13.73 | 663 |
| 100/10/1.0 | 12.61 | 610 | 11.75 | 531 |
| 100/15/1.5 | 11.72 | 600 | 10.75 | 556 |
| 100/20/2.0 | 11.50 | 548 | 11.20 | 237 |

TABLE 3

The effect of storage on the tensile properties of PE/cornstarch without compatibilizer but with plasticizer (glycerol, 25% based on starch weight)

| PE/Cornstarch/Plasticizer | Tensile Strength (Mpa) | Elongation at Break (%) | After one-month storage | |
|---|---|---|---|---|
| | | | Tensile Strength (Mpa) | Elongation at Break (%) |
| 100/5/1.25 | 13.62 | 649 | 12.35 | 597 |
| 100/10/2.5 | 13.16 | 605 | 11.08 | 503 |
| 100/15/3.75 | 12.37 | 541 | 11.70 | 86 |
| 100/20/5.0 | 12.23 | 437 | 11.26 | 96 |
| 100/30/7.5 | 12.61 | 181 | 11.48 | 57 |

TABLE 4

The effect of storage on the tensile properties of PE/cornstarch without compatibilizer and without plasticizer

| PE/Cornstarch/Plasticizer | Tensile Strength (Mpa) | Elongation at Break (%) | After one-month storage | |
|---|---|---|---|---|
| | | | Tensile Strength (Mpa) | Elongation at Break (%) |
| 100/5/0 | 12.93 | 709 | 13.65 | 679 |
| 100/10/0 | 12.76 | 613 | 12.52 | 607 |
| 100/15/0 | 12.67 | 598 | 9.87 | 514 |
| 100/20/0 | 10.06 | 459 | 9.71 | 465 |

EXAMPLE 2

Low density polyethylene (LDPE, LDPE 6401, Dow Chemical Co., Midland, Mich.) with a melt flow index of 2 g/10 min was used. Common corn starch was obtained from Cerestar USA, Inc. (Hammond, Ind.). Corn starch was dried at 120° C. for 24 hr. to a moisture content of less than 1% prior to sample preparation. PE-g-MA with an approximate maleic anydride content of 3 wt % was purchased from Aldrich Chemical Company Inc. (Milwaukee, Wis.).

Corn starch and LDPE (25/100) were pre-mixed at room temperature using a KitchenAid mixer (St. Joseph, Mich.) with different amounts of compatibilizer (PE-g-MA, 0, 5, 10, 15, 20, 25 and 35% w/w based on starch) in order to determine the critical saturated interfacial concentration of PE-g-MA for the corn starch and LDPE system. These mixtures were then melt-blended in a lab scale twin-screw counter-rotating extruder (PolyLab, ThermoHaake, Madison, Wis.) at 170° C. and 50 rpm.

Once the critical saturated interfacial concentration of PE-g-MA was identified, corn starch, PE-g-MA (the critical value based on starch weight) and LDPE were blended at starch to LDPE ratios of 5, 10, 15, 20, and 25% (w/w) according to above procedure.

Five dumb bell-shaped specimens were prepared from each extruded samples. The tensile tests were carried out using an Instron Universal Testing Machine (Model 1011, Instron, Canton, Mass.) at 23° C. with a crosshead speed of 20 mm/mill.

The general linear model procedure (SAS Software Institute, Cary, N.C. 1999) was used to identify difference among data. All significant differences were reported at the 95% confidence level.

For immiscible polymer blends, an interfacial agent, i.e. the compatibilizer, is needed to increase the compatibility and reduce the interfacial tension between components in order to obtain desired final properties. The concentration of compatibilizer in the interface of two immiscible components determines the efficacy of compatibilization. The critical interfacial concentration is the minimum value of interfacial saturation of an interfacial agent in the dispersed phase, which is an important parameter for the interfacial state between polymer components. When the concentration is below this critical value, the compatibilizer is not effective in improving the compatibilization of the polymer blends. The critical interfacial concentration is usually obtained from the emulsification curves, which relate the average dispersed phase particle diameter to the amount of added compatibilizer in the blends. This method is useful to characterize the morphology and the efficacy of a compatibilizer for a given interface. The curves of tensile strength and impact strength versus the concentration of the compatibilizer also exhibit the same trends as the emulsification curves. In fact, the dispersed phase particle size, tensile strength and impact strength all reflect the interfacial state, e.g. interfacial tension and adhesion. For the LDPE and starch blends, the emulsification curves were not suitable to determine the critical concentration because the starch granular size did not change with composition and with the addition of the compatibilizer. Therefore, the curve of tensile strength versus the amount of compatibilizer was used in the present study to characterize the interfacial state between starch and LDPE. The need for alternative methods of quantifying the invention's physical properties further illustrates its novelty.

Figure 4:
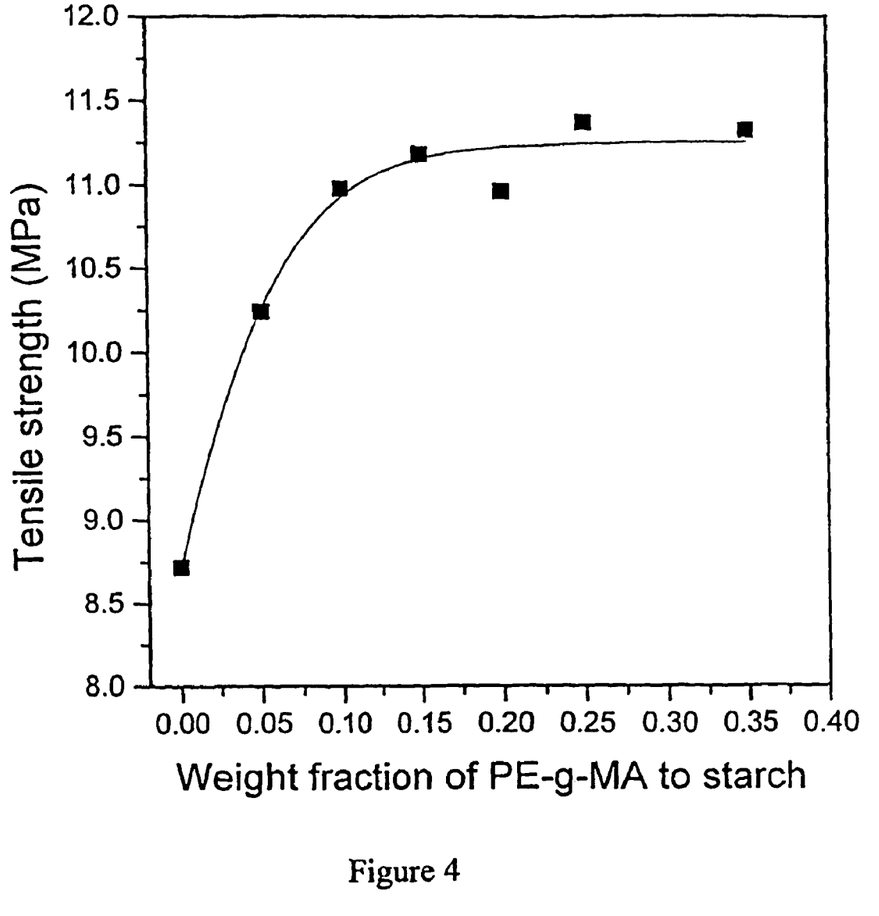
FIG. 4 is a graph showing the effect of compatibilizer concentration on a tensile strength.

The curve of tensile strength of starch and LDPE (25/100) blends versus the fraction of compatibilizer to starch is shown in FIG. 4. When the PE-g-MA content was below 10%, the tensile strength increased rapidly, indicating that the interface between starch and LDPE was not saturated and their interfacial adhesion was still weak. When the PE-g-MA content was above 10%, the tensile strength leveled off, implying that the interface between starch and LDPE was saturated by PE-g-MA and the interfacial tension reached a minimum value. This result indicates that the critical saturated interfacial concentration of PE-g-MA was approximately 10% of starch weight for the starch and LDPE (25/100) blends. Because the ratio of surface area to corn starch weight was constant and the starch granule size did not change with the composition of starch and LDPE blends, the critical interfacial concentration of PE-g-MA was only related to the starch weight. Thus, the critical interfacial concentration of PE-g-MA was used at 10% of the starch weight in all corn starch and LDPE systems.

Figure 5:
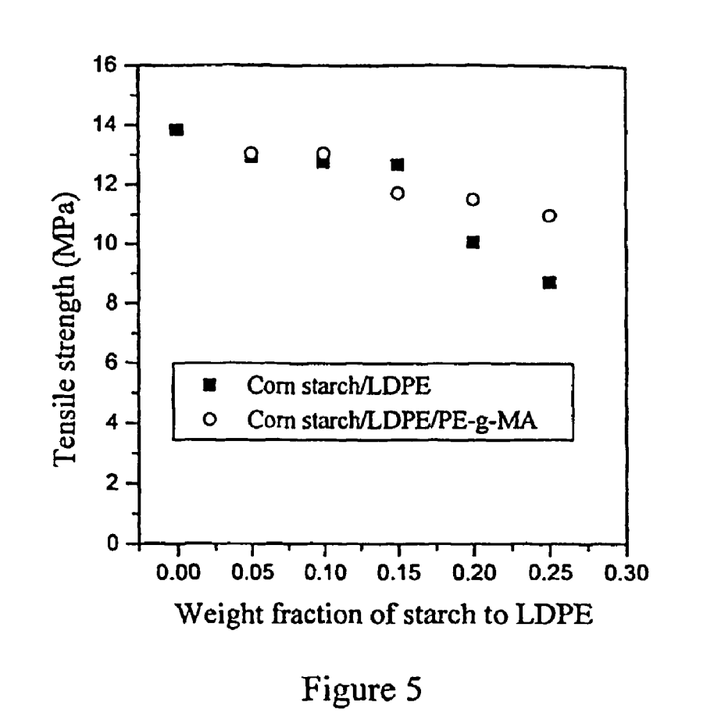
FIG. 5 shows a comparison of tensile strengths of mixtures both with and without a compatibilizer.
Figure 6:
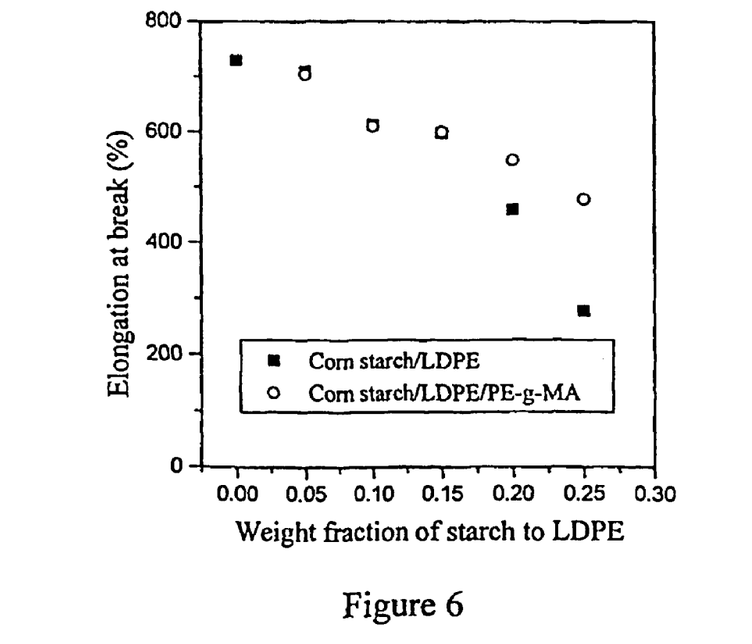
FIG. 6 is a comparison of elastic properties of mixtures both with and without a compatibilizer.

The ability of a polymeric material to resist deformation under an applied force depends on the mobility of the molecule and the ability to deform determines its mechanical properties. The molecular mobility of multi phase polymeric materials is determined by the interfacial properties because molecular mobility is discontinuous at the interface. Therefore, interfacial adhesion is a very important factor of controlling the mechanical properties of multi phase materials. The tensile properties of LDPE/corn starch blends without and with PE-g-MA are shown in FIGS. 5 and 6. When the corn starch content increased, the tensile strength and elongation at break of LDPE/corn starch blends decreased, presumably because of incompatibility of LDPE and starch. It is possible that the inclusion of corn starch in a LDPE matrix would cause a very significant stress concentration. Therefore, fracture would be initiated from the weak interface of the blend due to their poor interfacial adhesion, thus resulting in reduced tensile properties.

When PE-g-MA was added to the blends, the tensile strength and elongation at break of the blends were improved and the improvement was more pronounced at higher starch contents. PE-g-MA increased adhesion between the LDPE matrix and the starch filler. The improved interfacial adhesion between LDPE and corn starch had a positive impact on the stress transfer, thus reducing the chance of interfacial debonding and leading to improved tensile properties. In addition, these results also supported that the interaction between starch and PE-g-MA was of chemistry between hydroxyl groups in corn starch and anhydride groups in PE-g-MA because the polar interaction between them would not improve their properties to any significant extent.

The miscibility between granular corn starch and LDPE was improved with the addition of a commercially available compatibilizer, PE-g-MA. Results from DSC, SEM and tensile properties suggest that the improved compatibility was attributed to the chemical reaction between hydroxyl groups in starch and anhydride groups in PE-g-MA and the physical interaction between the PE in PE-g-MA and LDPE. Therefore it is possible to blend a high percentage of granular corn starch with LPDE while still showing comparable tensile properties.

Whereas, the present invention has been described in relation to the drawings attached hereto, it should be understood that other and further modifications, apart from those shown or suggested herein, may be made within the spirit and scope of this invention.

What is claimed is:

1. A synthetic polymer and starch blend comprising:
   1-30 wt. % a granular and unplasticized starch having a moisture content of less than about 1%;
   1-24 wt. % a compatibilizer comprising a polymer and a grafting compound, wherein said grafting compound is covalently bound to said polymer, and
   the remainder a second polymer.

2. The blend of claim 1 wherein said starch is selected from the group consisting of cornstarch, wheat starch, rice starch, and potato starch.

3. The blend of claim 1 wherein said compatibilizer is comprised of 75-98 wt. % polymer and 2-25 wt. % grafting compound.

4. The blend of claim 3 wherein said grafting compound is maleic anhydride.

5. The blend of claim 3 wherein the polymer of the compatibilizer is selected from the group consisting of polyethylene, polypropylene, polystyrene, polybutylene, poly(styrene-ethylene-butylene-styrene), poly(ethylene terephthalate), polyvinyl fluoride, polyvinyl chloride, or derivatives thereof.

6. The blend of claim 3 wherein said grafting compound comprises 5 wt. % of said compatibilizer.

7. The blend of claim 1 wherein said second polymer is selected from the group consisting of polyethylene, polypropylene, polystyrene, polybutylene, poly(styrene-ethylene-butylene-styrene), poly(ethylene terephthalate), polyvinyl fluoride, polyvinyl chloride, or derivatives thereof.

8. The blend of claim 1 wherein said second polymer is polyethylene.

9. The synthetic polymer and starch blend of claim 1 wherein the second polymer is selected from the group consisting of polyethylene, polypropylene, polystyrene, polybutylene, poly(styrene-ethylene-butylene-styrene), poly(ethylene terephthalate), polyvinyl fluoride, polyvinyl chloride or derivatives thereof and the compatibilizer is comprised of maleic anhydride grafted poly(styrene-ethylene-butylene-styrene).

10. The blend of claim 1 wherein said grafting compound is selected from the group consisting of epoxides.

11. A method for synthesizing a synthetic polymer and starch blend, comprising:
    mixing 1-30 wt. % granular and unplasticized starch having a moisture content of less than about 1% with 1-24 wt. % compatibilizer comprising a polymer and a grafting compound, wherein said grafting compound is covalently bound to said polymer, and the remainder a second polymer; and
    reacting the mixture such that the compatibilizer and the granular starch become covalently bound.

12. The method of claim 11 wherein said reacting comprises applying heat and pressure.

13. The method of claim 11 wherein said second polymer is selected from the group consisting of polyethylene, polypropylene, polystyrene, polybutylene, poly(styrene-ethylene-butylene-styrene), poly(ethylene terephthalate), polyvinyl fluorides, polyvinyl chloride, or derivatives thereof.

14. The method of claim 11 wherein said compatibilizer comprises 1-20 wt. % grafting compound and 80-99 wt. % polymer.

15. The method of claim 14 wherein said grafting compound is maleic anhydride.

16. The method of claim 14 wherein said grafting compound comprises 5 wt. % of said compatibilizer.

17. The method of claim 14 wherein the polymer of the compatibilizer is selected from the group consisting of polyethylene, polypropylene, polystyrene, polybutylene, poly(styrene-ethylene-butylene-styrene), poly(ethylene terephthalate), polyvinyl fluoride, polyvinylchloride, or derivatives thereof.

18. A synthetic polyethylene and starch covalently bound mixture comprising:
    5-30 wt. % of as granular and unplasticized starch selected from the group consisting of wheat starch, cornstarch, rice starch, potato starch or high amylose starch, wherein said starch is not gelatinized and has a moisture content of less than about 1%;
    a first polymer selected from the group consisting of polyethylene, polypropylene or polyethylene derivatives;
    a compatibilizer comprising a polymer and a grafting compound, the grafting compound being selected from the group consisting of maleic anhydride or chemicals having similar reactive properties, and the polymer being covalently bound to the grafting compound;
    wherein application of heat and pressure to the mixture produces covalent bonds between the compatibilizer and the starch;
    wherein said compatibilizer is covalently bound to said first polymer;
    wherein said starch granules are 10-100 micrometers in diameter;
    wherein about 5 wt. % of monomer units of said compatibilizer have the grafting compound attached;
    wherein the resulting mixture has similar mechanical properties to pure polyethylene; and
    wherein said mixture absorbs relatively little water.

* * * * *